US012460546B1

(12) United States Patent
Larew et al.

(10) Patent No.: US 12,460,546 B1
(45) Date of Patent: Nov. 4, 2025

(54) EXTERNAL FLUID BAR FOR FLUID DRIVEN CYLINDER

(71) Applicant: Swanson Industries, Inc., Morgantown, WV (US)

(72) Inventors: Christopher Scott Larew, Newburg, WV (US); Naveen Koka, Oakdale, PA (US)

( * ) Notice: Subject to any disclaimer, the term of this patent is extended or adjusted under 35 U.S.C. 154(b) by 0 days.

(21) Appl. No.: 18/774,889

(22) Filed: Jul. 16, 2024

(51) Int. Cl.

| | |
|---|---|
| ***F15B 15/14*** | (2006.01) |
| ***E21D 23/26*** | (2006.01) |
| ***F15B 11/20*** | (2006.01) |
| ***F15B 13/08*** | (2006.01) |

(52) U.S. Cl.
CPC .......... *F15B 15/1428* (2013.01); *E21D 23/26* (2013.01); *F15B 11/20* (2013.01); *F15B 13/08* (2013.01)

(58) Field of Classification Search
CPC ...... F15B 15/1428; F15B 11/20; F15B 13/08; E21D 23/26
See application file for complete search history.

(56) References Cited

U.S. PATENT DOCUMENTS

| | | | | |
|---|---|---|---|---|
| 1,921,023 A * | 8/1933 | Chambers | F01L 25/06 | 91/291 |
| 3,838,625 A * | 10/1974 | Bell | F15B 15/16 | 92/85 R |
| 3,845,694 A * | 11/1974 | Berg | F15B 15/224 | 91/290 |
| 4,060,221 A * | 11/1977 | Rilbe | B66C 23/705 | 92/53 |
| 4,523,512 A * | 6/1985 | Hessel | F15B 15/16 | 91/173 |
| 4,600,340 A * | 7/1986 | Rosenberg | E21D 23/085 | 405/297 |
| 5,190,414 A * | 3/1993 | Bemmerl | E21D 23/0436 | 405/297 |
| 5,252,006 A * | 10/1993 | Plevak | E21D 23/0436 | 405/297 |
| 6,209,440 B1 * | 4/2001 | Dannehl | E21D 15/44 | 92/52 |
| 6,615,705 B2 * | 9/2003 | Reinelt | E21D 15/15 | 91/169 |
| 8,297,888 B2 * | 10/2012 | Voss | E21D 15/44 | 405/294 |
| 9,512,688 B2 | 12/2016 | Hallundbaek | | |

* cited by examiner

*Primary Examiner* — Dustin T Nguyen
(74) *Attorney, Agent, or Firm* — Richard W. James

(57) ABSTRACT

A fluid driven cylinder having an integrated fluid channel. The fluid driven cylinder including an extended bar with a first surface continuously contacting the hydraulic cylinder barrel and a hydraulic fluid passage extending into a fluid chamber of the cylinder formed inside the extended bar.

2 Claims, 9 Drawing Sheets

EXTERNAL FLUID BAR FOR FLUID DRIVEN CYLINDER

FIELD OF THE INVENTION

This invention is related to hydraulic cylinders, and more particularly to an apparatus and method for providing operating fluid to a hydraulic cylinder.

BACKGROUND OF THE INVENTION

Pneumatic and hydraulic fluid driven cylinders are cylinders with a piston or a piston rod that are moved by fluid—pneumatic or hydraulic commonly—that are used in many applications, from heavy machinery and vehicles to industrial, manufacturing, mining, and agricultural applications. Moreover, pneumatic and hydraulic cylinders are used to move loads of all types.

A cylinder generally includes a cylindrical block of material having a circular bore in it. A piston is disposed in the circular bore of the cylinder. A piston rod extends from the piston, through a cylinder base and out of the cylinder through a rod opening and be connected to another mechanism.

Fluid powered hydraulic and pneumatic powered cylinders can be configured in many ways: (1) to push a load attached to a rod extending from the piston through a portion of the cylinder, (2) to pull a load attached to a rod extending from the piston through a portion of the cylinder, or (3) to hold a load attached to a rod extending from the piston through a portion of the cylinder in place, for example.

Thus, an arm of a machine may, for example, be raised by applying hydraulic pressure to a first side of a piston in a cylinder, the piston having a rod that is attached to the arm of the machine, and the same arm may be lowered by reducing hydraulic pressure on the first side of the piston in the cylinder. That arm may alternatively be held in a position by maintaining pressure applied to the first and second sides of the piston in the cylinder once the arm has reached its desired position.

Hydraulic and pneumatic cylinders may be used in many applications, for example, in heavy machinery where one or more cylinders are used to move or hold in position portions of the machinery, such as mining equipment, shovels and buckets, or to hold a piece of machinery in position, such as a retractable bracing arm.

One type of cylinder may be coupled to a load, such as a mine shield stepping apparatus or a damper, and may be extended or retracted, and in turn move the load. Another type of cylinder may be to hold an apparatus such as a mine shield in a position continuously for a long period of time. For example, a cylinder may be used to press a mine shield toward a roof of a mine by applying pneumatic or hydraulic pressure in a cylinder to a piston.

In an application in which a cylinder is cycled from extended to retracted and various points of extension, the second side of the piston may be biased, for example, to move the piston toward the first side of the cylinder, by a spring or other biasing device. Thus, in that embodiment, fluid pressure is applied to the first side of the piston in the cylinder to push the piston rod to extend a piston rod out or further out from the second side of the cylinder and fluid pressure power is simply removed from the first side of the piston in the cylinder to allow the bias to actuate the piston rod back into the second side of the cylinder.

Another type of cylinder, often referred to as a double-acting cylinder, uses fluid power on each side of the cylinder. Fluid applied to the first side of the piston in the cylinder tends to move the piston away from the first side of the cylinder toward the second side of the cylinder and fluid applied to the second side of the piston tends to move the piston away from the second side of the cylinder toward the first side of the cylinder.

Yet another piston may be coupled to a load and pressurized fluid may be applied to both sides of the piston in the cylinder to maintain the load in a small range of positions by applying the pressurized fluid to resist movement toward the first side of the cylinder or the second side of the cylinder. In one such embodiment, one or more cylinders are used as tensioners for an ocean situated drilling rig or other machine. Tensioner cylinders can have high pressure fluid applied at each end, thereby applying force to both sides of the piston to maintain the piston near a desired position. The tensioner cylinder can furthermore have an inlet on one or both sides of the piston and the inlets can be connected to a pressurized fluid, generally proximate to a different source for each end, though both ends may ultimately use the same fluid source. The tensioner piston rod may then be attached to a fixed location such that the tensioner may resist undulation, for example rising and falling of a floating drilling rig caused by waves.

Thus, hydraulic and pneumatic cylinders can push against a load, pull against a load, or both push and pull against a load.

There may be a need for improved apparatuses and methods for supplying fluid pressure to a cylinder.

There may be a need for apparatuses and methods to provide fluid pressure to a cylinder that are integral to the cylinder.

There may be a need for apparatuses and methods for rugged uses in mining applications where stones and earth may fall on the cylinder and the cylinder may be struck regularly and repeatedly by workers and conditions that exist in a punishing, severe mine setting.

There may be a need for apparatuses and methods that provide fluid pressure to a cylinder through the cylinder without affecting the path of a round piston through an inner chamber of the cylinder barrel.

There may be a need for apparatuses and methods wherein the fluid channel is disposed on the housing of the cylinder barrel.

There may be a need for apparatuses and methods wherein the fluid channel is enclosed in an extended bar on the cylinder barrel.

There may be a need for apparatuses and methods wherein the extended bar is attached to an outer surface of the cylinder barrel.

There may be a need for apparatuses and methods wherein the extended bar is attached to the cylinder barrel.

There is a need for apparatuses and methods wherein the extended bar is formed on the cylinder barrel.

There may be a need for apparatuses and methods wherein the fluid channel is formed in the housing of the cylinder barrel.

There may be a need for such cylinder apparatuses and methods for use in longwall mining applications in which existing apparatuses and methods create situations in which fluid channels are damaged, for example crushed or pulled away from the cylinder served by the fluid channels because of the exposed disposition of the fluid channels in relation to the cylinder.

There may be a need for such cylinder apparatuses and methods for use in longwall mining applications in which existing apparatuses and methods create situations in which fluid channels are damaged by materials that accumulate along channels or between the fluid channels and the cylinder the fluid channels serve.

During longwall mining, a drum or other shear advances along a wall of coal, shearing off a layer of coal for collection. Mine roof supports, such as shield canopy mine roof support systems, contact the mine roof during the shearing operation to prevent roof collapse and are operated by hydraulic cylinders that are frequently damaged and require additional protection to facilitate continued operation.

Once shearing has occurred on a section of the longwall, the shield canopy is moved forward toward the coal seam using hydraulic cylinders to position it for the next shearing cycle. Furthermore, the mining shield may advance by way of a base lift operated by hydraulic cylinders pressing against a relay bar to lift the shield, while another hydraulic cylinder that moves the shield toward the seam being mined. The base lift is, therefore, a heavy piece of equipment that is performing a heavy, demanding, important function and doing so in a difficult, hazardous, underground environment. Because the base lift operates in such a harsh setting, it must hold-up well and be maintained regularly.

Accordingly, sturdy, robust hydraulic cylinders for efficiently operating shield including shield canopies are needed and those apparatuses should be amenable to fast, easy maintenance to keep the longwall mining process going efficiently and an apparatus that meets those requirements is needed.

Thus, there remains a need for a mining shield hydraulic cylinder that is built for rugged conditions and is readily amenable to maintenance.

BRIEF DESCRIPTION OF THE DRAWINGS

The accompanying drawings, wherein like reference numerals are employed to designate like components, are included to provide a further understanding of cylinder apparatuses and methods, are incorporated in and constitute a part of this specification, and show embodiments of those apparatuses and methods that together with the description serve to explain those apparatuses and methods.

Various other objects, features and advantages of the invention will be readily apparent according to the following description exemplified by the drawings, which are shown by way of example only, wherein:

FIG. 8 illustrates a perspective view of a pipe carrying fluid disposed along a hydraulic cylinder;

SUMMARY OF THE INVENTION

Figure 1:
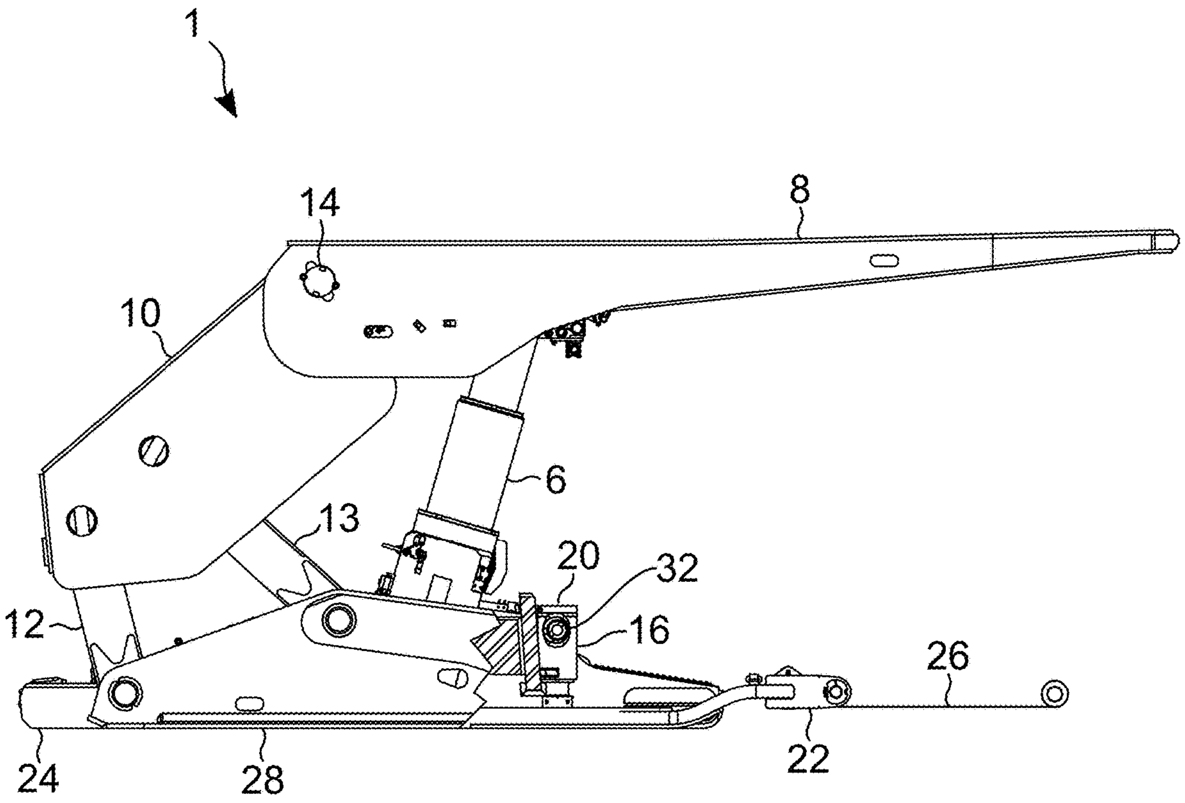
FIG. 1 illustrates a side view of an embodiment of a longwall mining shield in accordance with certain shield embodiments.

In an embodiment, a hydraulic cylinder has an integral fluid channel to prevent damage from occurring between the hydraulic cylinder and the fluid channel. The hydraulic cylinder includes a hydraulic cylinder barrel having a continuous axial inner surface having a cross-section, an outer surface, a first end enclosed by an end cap, and a second end. A piston is disposed in and extends across the cross-section of the inner chamber of the hydraulic cylinder, the piston having a first end proximate to the first end of the hydraulic cylinder barrel and a second end distal from the first end of the hydraulic cylinder. A first fluid chamber is defined by the first end of the piston, a first portion of the inner surface of the cylinder, and the end cap. An extended bar has a first surface continuously contacting the hydraulic cylinder barrel and a hydraulic fluid passage in fluid communication with the first fluid chamber and formed inside the extended bar.

In embodiments, the hydraulic cylinder includes a second piston disposed inside the first piston and forming a second chamber between an inner surface of the piston and an outer surface of the second piston. A valve disposed through the piston may permit conditional flow between the first fluid chamber and the second fluid chamber.

In another embodiment, a method of creating an extended bar containing one or more fluid channels on a fluid driven cylinder is disclosed. In that method, at least one fluid channel is formed in an extended bar, the extended bar is attached to a fluid driven cylinder, at least one fluid channel is extended to an inner chamber of the cylinder and a flow control device is disposed in fluid communication with the fluid channel for controlling fluid flow to the inner chamber of the cylinder.

In yet another embodiment, a longwall mine shield leg hydraulic cylinder is disclosed. That longwall mine shield leg hydraulic cylinder has a hydraulic cylinder barrel having a continuous axial inner surface a cross-section, an outer surface, a first end having an end cap, and a second end. That longwall mine shield hydraulic cylinder also has a first piston disposed in and extending across the cross-section of the hydraulic cylinder, and a second piston disposed in and extending across a cross-section of an axial inner surface of the first piston. The first piston has a first end proximate the first end of the hydraulic cylinder barrel, a second end distal from the first end of the hydraulic cylinder barrel, and an axial inner surface closed at the first end of the first piston. A first fluid chamber is defined by the first end of the piston, a first portion of the axial inner surface of the hydraulic cylinder barrel, and the end cap of the hydraulic cylinder barrel. The second piston has a first end proximate the first end of the first piston, and a second end distal from the first end of the first piston. A second fluid chamber defined by the first end of the second piston and the closed axial inner surface of the first piston. An extended bar has a first surface continuously contacting the hydraulic cylinder barrel and a hydraulic fluid passage in fluid communication with the first fluid channel is formed inside the extended bar.

Other embodiments, which may include one or more parts of the aforementioned apparatus and method or other parts, are also contemplated, and may thus have a broader or different scope than the aforementioned apparatus and method. Thus, the embodiments in this Summary of the Invention are mere examples, and are not intended to limit or define the scope of the invention or claims.

DETAILED DESCRIPTION

Reference will now be made to embodiments of longwall mining shield base plate apparatuses and methods, examples of which are shown in the accompanying drawings. Details, features, and advantages of base plate apparatuses and methods will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

Figure 2:
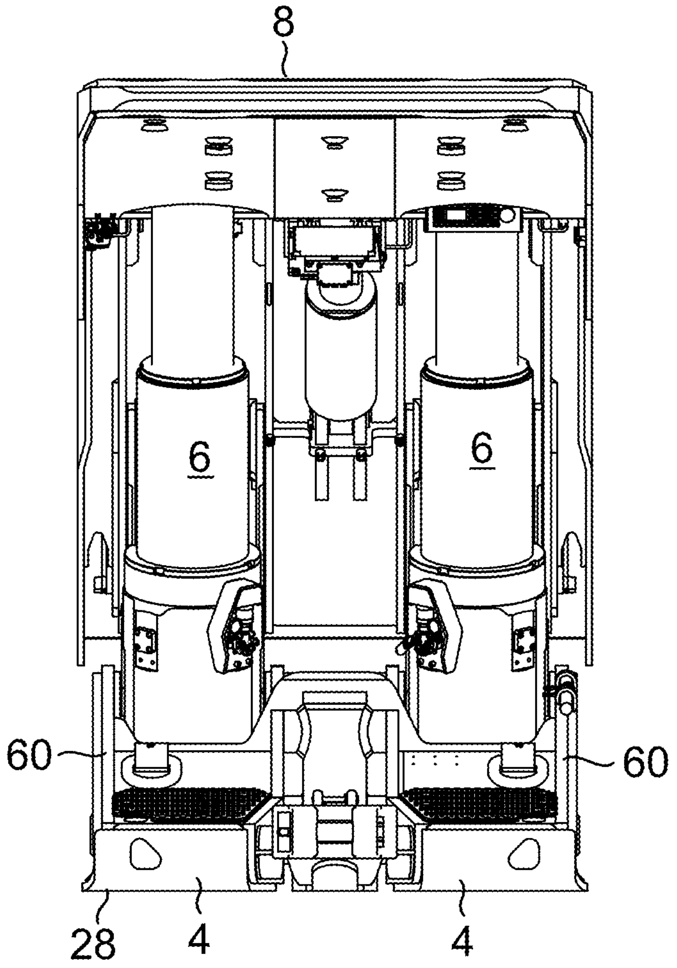
FIG. 2 illustrates a front view of the longwall mining shield embodiment illustrated in FIG. 1.

FIG. 1 illustrates a side view of an embodiment of a longwall mining shield 1 and FIG. 2 is a front view of the longwall mining shield 1 embodiment illustrated in FIG. 1. That embodiment of the longwall mining shield 1 includes two parallel pontoons 4 that support a pair of leg cylinders 6 that, in turn, support the canopy 8. A caving back 10 is connected to two pontoons 4 by way of front and rear links 12 and 13 and is connected to the canopy 8 by a pin 14. The height of the canopy may be adjusted by hydraulically operating the leg cylinders 6.

An advancing mechanism 16, which may include at least one base lift 20, a relay bar 22 and at least one ram cylinder 24 is depicted in the embodiment illustrated. The advancing mechanism 16 is also attached to the pontoons 4 to move the shield 1 toward the longwall face. The shield 1 of this embodiment is attached to a panline 26 through the relay bar 22 and the panline 26 includes a conveyor and a chain that move sheared coal away from the longwall face. After a depth of coal has been harvested from the longwall, the ram cylinder 24 extends the relay bar 22 out, pushing the panline 26 toward the new longwall face when the shield 1 is set against the mine roof. To advance the shield 1, the shield 1 canopy 8 is lowered and at least one base lift 20 is hydraulically activated, extending the base lift 20 to press against the relay bar 22 between the pontoons 4, thereby lifting the front of a shield 1 base 28. Once the front of the shield 1 base 28 is lifted, the at least one ram cylinder 24 is retracted pulling the shield 1 toward the longwall face. Once the shield 1 has been moved toward the longwall face, the base lift 20 is deactivated, thereby reducing the length of the base lift 20 and allowing the pontoons 4 to rest on the surface below them. The base lift 20 may then gravitationally swing toward a vertical position, rotating on one or more shafts 32 pivotally connecting the base lift 20 to the shield base 28 so the base lift 20 is positioned for activation for the next advance of the shield 1.

Figure 3:
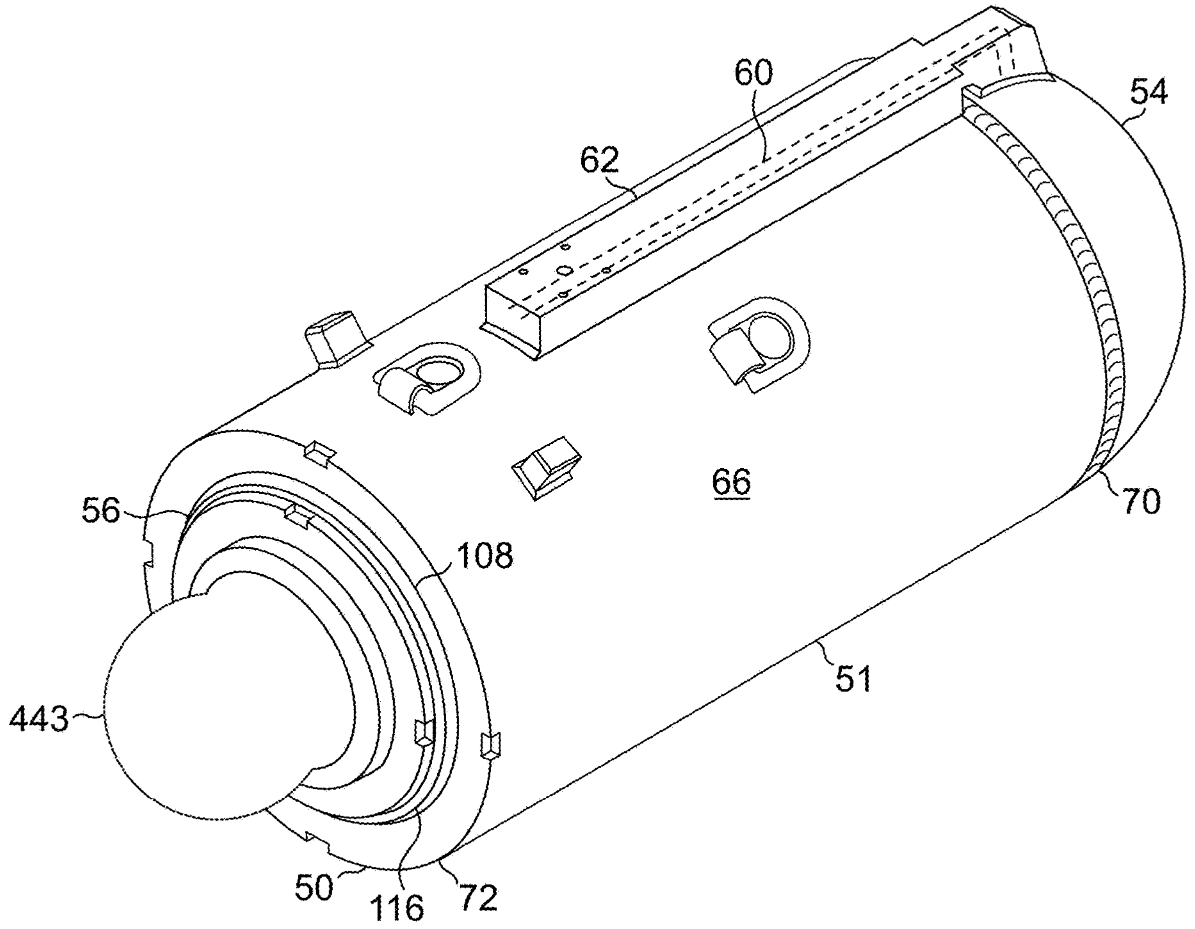
FIG. 3 illustrates a perspective view of a fluid driven cylinder having an integral fluid channel disposed in an extended bar.

FIG. 3 illustrates a perspective view of a fluid driven cylinder 50 of the present invention. The fluid driven cylinder 50 may be hydraulically operated or pneumatically operated, for example. The fluid driven cylinder 50 may include a fluid driven cylinder barrel 51 having a housing 53 with an internal surface 52 (illustrated in FIGS. 4 and 7) and an external surface 66 and a hydraulic fluid channel 60 formed in an extended bar 62 attached to or formed on an external surface 66 of the fluid driven cylinder barrel 51. Alternatively, the hydraulic fluid channel 60 may be encapsulated in the extended bar 62 attached to or formed on an external surface 66 of the fluid driven cylinder barrel 51. The extended bar 62, in turn, may be formed on the fluid driven cylinder barrel 51 or the extended bar 62 may be attached to the exterior surface 66 of the fluid driven cylinder barrel 51. In another embodiment, the extended bar 62 may be encapsulated in the housing 53 of the fluid driven cylinder barrel 51.

The fluid driven cylinder barrel 51 may be formed by cold drawing seamless tubes through one or more dies, extrusion, wrapping and welding or otherwise connecting sheet goods or metal, molding, or otherwise as desired. The hydraulic cylinder barrel 50 may be honed on its inner surface 52 to create a precisely dimensioned, smooth inner surface 52. A cylinder head or end cap 54 may be used to close a first end 70 of the fluid driven cylinder barrel 51. A base or gland 56 may be used to close a second end 72 of the fluid driven cylinder barrel 51.

Figure 4:
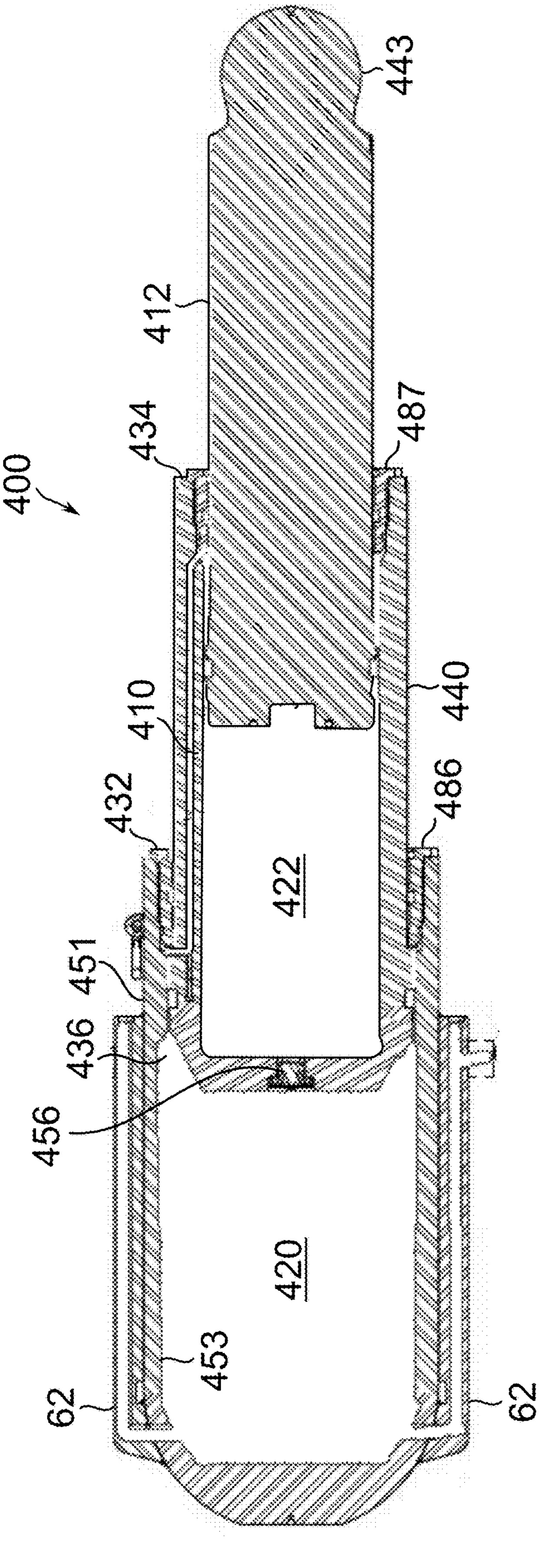
FIG. 4 illustrates of a sectional view of an embodiment of a two-stage hydraulic cylinder having a fluid channel in an extended bar cut along a central plane.
Figure 5:
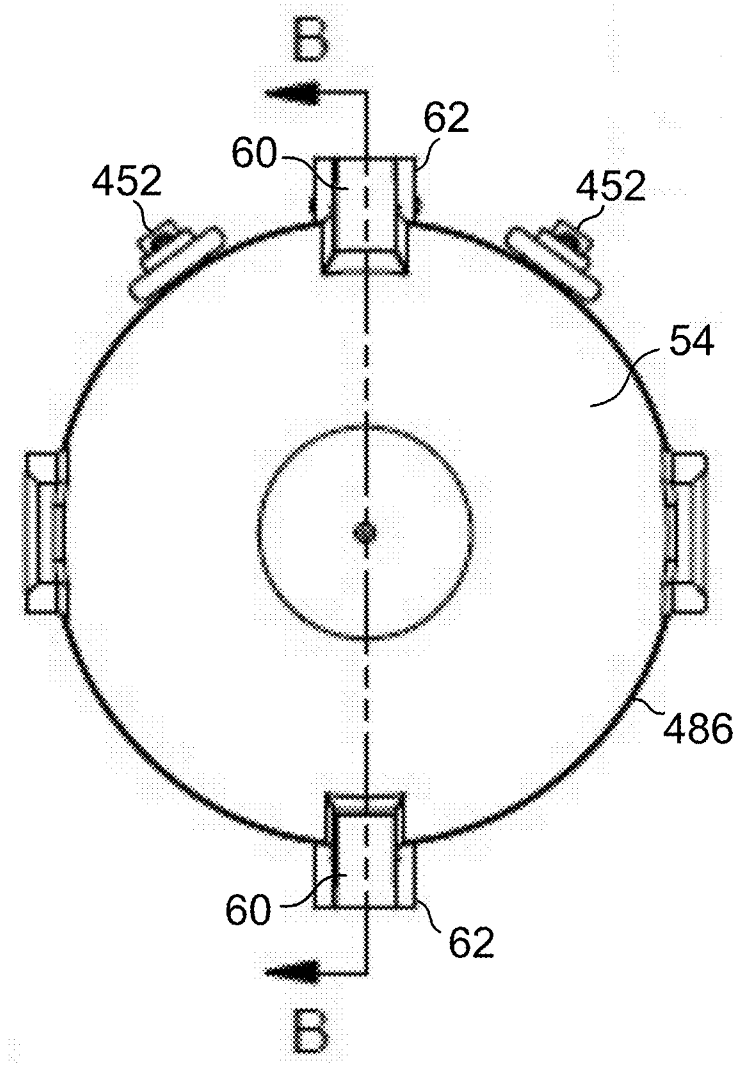
FIG. 5 illustrates a second end view of the hydraulic cylinder depicted in FIG. 4.

FIG. 4 illustrates a section of an embodiment of a hydraulic cylinder having two external bars 62. The hydraulic cylinder depicted in FIG. 4 is a two-stage telescoping hydraulic cylinder 400 that may be used on a longwall mining shield, such as the shield 1 illustrated in FIG. 1, as a leg 6 or for another purpose. The hydraulic cylinder 400 includes a hydraulic cylinder barrel 451, a first stage piston 410, and a second stage piston 412. The first pressurizable chamber 420 is disposed between an inner surface 453 of the cylinder barrel 451 and the first stage piston 410. A second pressurizable chamber 422 is disposed between the first stage piston 410 and the second stage piston 412. When pressurized hydraulic fluid is applied to the first pressurizable chamber 420, force is applied to the first stage piston 410 that will tend to push the first stage piston 410 out of the cylinder barrel 451 and when pressurized hydraulic fluid is applied to the second pressurizable chamber 422, force is applied to the second stage piston 412, which tends to push the second stage piston 412 out of the first stage piston 410. The telescopic hydraulic cylinder 400 of FIG. 5 is in an extended position as it might be in operation when hydraulic fluid under pressure is applied to the first pressurizable chamber 420 of the hydraulic cylinder barrel 451 and hydraulic fluid under pressure is applied to a second pressurizable chamber 422 in the first stage piston 410. A first gland 486 is attached to a first end 432 of the cylinder barrel 451 and a second gland 487 is attached to a first end 434 of the first stage piston 410. The first gland 486 seals against leakage from the first pressurizable chamber 420 and the second gland 487 seals against leakage from the second pressurizable chamber 422.

Figure 6:
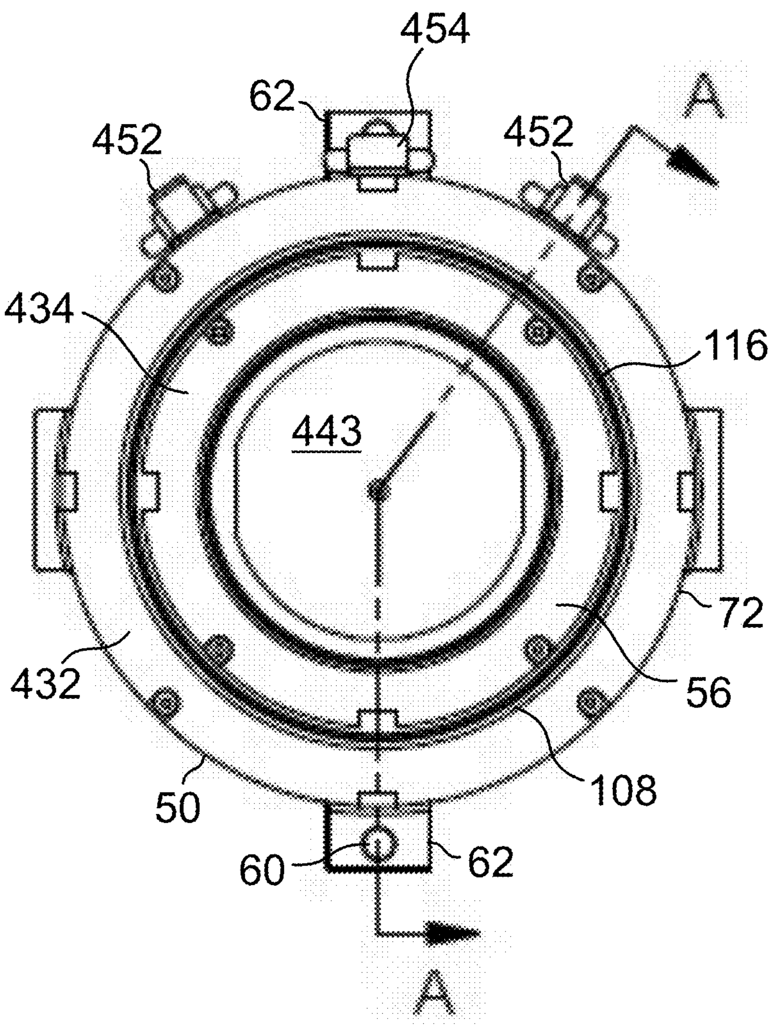
FIG. 6 illustrates a first end view of the hydraulic cylinder depicted in FIGS. 4 and 5 and shows the section along which the hydraulic cylinder of FIG. 4 is sectioned.

The embodiment illustrated in FIG. 6 includes a yield valve 454, a pair of supply check valves 452, and a first stage piston check valve 456 (the last of which is depicted in FIG. 4). The yield valve 454 may provide relief if pressure in the first pressurizable chamber 420 exceeds a setting of the yield valve 454. The supply check valve 452 may permit flow of hydraulic fluid into the first pressurizable chamber 420 and prevent back flow of hydraulic fluid in the first pressurizable chamber 420 from flowing out of the first pressurizable chamber 420. The first stage piston check valve 456 may permit hydraulic fluid to flow into the second pressurizable chamber 422 from the first pressurizable chamber 420 and prevent hydraulic fluid from flowing out of second pressurizable chamber 422 into the first pressurizable chamber 420.

In this embodiment, pressure applied to the first pressurizable chamber 420 to apply pressure on the first stage piston 410 may flow through the first stage piston check valve 456 into the second pressurizable chamber 422 to apply pressure in the second pressurizable chamber 422 and to the second stage piston 412. It should be noted that, in the embodiment illustrated in FIG. 4, the first stage piston 410 has a smaller diameter 456 than the diameter 458 of the barrel 451. In certain circumstances, fluid pressure in the second pressurizable chamber 422 may be maintained at a higher pressure than fluid pressure in the first pressurizable chamber 420 so that force applied to the second stage piston 412 can be increased to approximately the force applied to the first stage piston 410.

Thus, in one embodiment, pressure may be applied to the second pressurizable chamber 422 through the first stage piston check valve 456 that extends through the first stage piston 410. In an embodiment, that first stage piston check valve 456 is set to allow pressurized fluid to flow from the first pressurizable chamber 420 to the second pressurizable chamber 422 and to restrict pressurized fluid flowing from the second pressurizable chamber 422 to the first pressurizable chamber 420 such that the fluid pressure in the second pressurizable chamber 422 cannot flow from the second pressurizable chamber 412 to the first pressurizable chamber 420, such that pressure in the second pressurizable chamber must exceed a predetermined force to be permitted to flow back from the second pressurizable chamber 422 into the first pressurizable chamber 420, or until a switch 470 opens the valve 456 to fluid flow from the second fluid chamber 422 to the first fluid chamber 420 when, for example, the first pressurizable chamber 420 is drained to near empty and the switch 470 contacts the hydraulic cylinder barrel 451, thereby opening the first stage piston check valve 456 to flow from the second pressurizable chamber 422 to the first pressurizable chamber 420. In that way, for example, the first pressurizable chamber 421 and the second pressurizable chamber 421 may be pressurized with hydraulic fluid flowing into the first pressurizable chamber 420 to a predetermined pressure, then pressurized fluid can be removed from the first pressurizable chamber 420 while higher pressure pressurized hydraulic fluid remains in the second pressurizable chamber 421.

In another embodiment, pressurized fluid may be provided to the second pressurizable chamber 422 directly through a fluid channel 60. That fluid channel 61 may be separate from the fluid channel 60 that supplies the first pressurizable chamber 420.

FIG. 6 illustrates an end view of the telescoping hydraulic cylinder 400 depicted in FIG. 4. In the embodiment illustrated in FIG. 6, the second end 432 of the barrel 451, the second end 434 of the first stage piston 410, and the second end 443 of the second stage piston 412 may be seen.

FIG. 6 also illustrates the extended bar 62 protecting the fluid channel 60. The hydraulic cylinder bore 116 is indicated and a yield valve 454 and a pair of supply check valves 452 are illustrated in addition.

FIG. 5 illustrates a first end view of the telescoping hydraulic cylinder 400 depicted in FIGS. 4 and 5. That view depicts the end cap 54 of the hydraulic cylinder 451, a pair of extended bars 62 and a pair of supply check valves 452.

Figure 7:
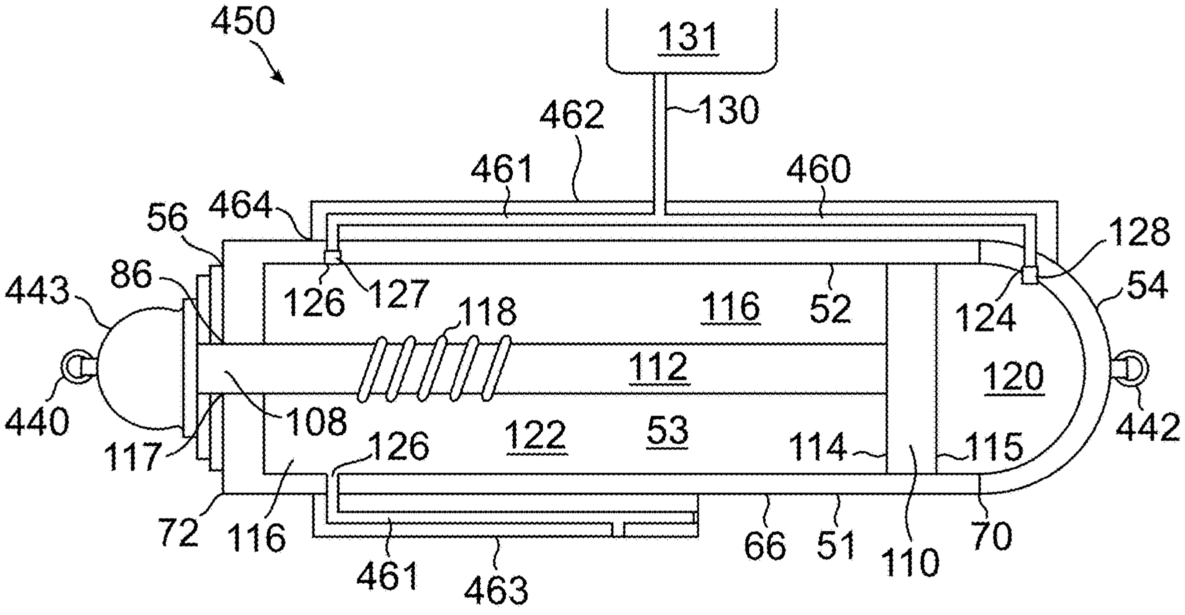
FIG. 7 illustrates a sectional view cut along a central plane of another embodiment of a hydraulic cylinder having a fluid channel in an extended bar.

FIG. 7 illustrates a sectional view cut along a central plane of another embodiment of a hydraulic cylinder having a fluid channel in an extended bar. In that alternative embodiment, the base or gland 56 may include a rod opening 108, the rod opening 108 in this embodiment being a hole bored in the base 56 that is coaxial with the cylindrical fluid driven cylinder barrel 51, a piston 110 disposed in a bore 116 in the fluid driven cylinder barrel 51, and a rod 112 extending from the piston 110 through the rod opening 108 in the base or gland 56 of the fluid driven cylinder 450. The rod opening 108 in this embodiment has a seal 117 placed therein that seals against leakage through the rod opening 108, whether against fluid in the second chamber 122 of the cylinder 450 leaking out of the second chamber 122 of the cylinder 450 or against fluids, gasses, or solids making their way into the cylinder 450. The seal 117 may seal against the cylinder 450 as well as against the piston rod 112. A variety of seals 117 and glands 86 may be used together or independent of one another, and may include, for example, a primary seal, a secondary seal, one or more wear bands, a wiper, a scraper, and a static seal.

The seals 116 may furthermore be elastomer seals made from nitrile rubber, high-fluorine rubbers, or other materials as desired or as required to meet operating conditions.

The fluid driven cylinder barrel 51, end cap 54, and base 56 may be formed of aluminum, stainless steel, steel, steel alloys, copper, various plastics, or another desired material.

The fluid driven cylinder 450 may include a first pressurizable chamber 120, a piston 110, and a piston rod 112. The piston 110 may extend across the fluid driven cylinder barrel 51 bore 116 and separate the first pressurizable chamber 120 in the fluid driven cylinder barrel 51 from a second chamber 122 in the fluid driven cylinder barrel 51. The piston rod 112 may be attached to the piston 110 on a first side 114 of the piston 110 and extend through the second chamber 122, through the base 56, possibly through a seal 117 or a gland 86 and extend external to the fluid driven cylinder 450. The piston rod 112 may furthermore be attached near a central location on the first side 114 of the piston 110. The piston rod 112 may be formed of chrome plated cold rolled steel or another material to meet operating conditions.

Hydraulic cylinders may be single acting, wherein pressurized fluid is applied to and removed from the first pressurizable chamber 120 on a second side 115 of the piston 110 or the hydraulic cylinder may be double acting, wherein pressurized fluid may be applied to and removed from the first pressurizable chamber 120 and also to the second chamber 122, which may cause the second chamber to be pressurizable. A spring 118 or other biasing element may be included in the second chamber 122 to bias the piston toward the first pressurizable chamber 120 when pressure is reduced in or removed from the first pressurizable chamber 120.

A flow control device 127 may be included for each pressurizable chamber 120, 122. Where the second chamber 122 is not pressurizable, no flow control device 127 may be provided for that chamber 122. The flow control device 127 is in fluid communication with one of the pressurizable chambers 120, 122 and the fluid channel 60 to allow fluid to flow into and possibly out of the respective pressurizable chambers 120, 122. The flow control device 127 may be located adjacent to an inlet port 124, 126 extending through the fluid driven cylinder 450 into one of the pressurizable chambers 120, 122.

Flow control devices 127 may include orifices, regulators, bypass regulators, demand-compensated flow controls, pressure-compensated flow valves, valves, and other desired flow control devices 127.

The first pressurizable chamber 120 may be located in the fluid driven cylinder barrel 51 bore 116 on the second side 115 of the piston 110, the side of the piston 110 that is not attached to the piston rod 112. When positive pressure is provided in the first pressurizable chamber 120, the pressure may urge the piston 110 to move in the cylinder 100 bore 116 and cause the piston rod 112 to extend out of the fluid driven cylinder barrel 51 further than when pressure is not applied to the first pressurizable chamber 120.

The cylinder 100 may also include a second pressurizable chamber 122, which may be pressurized positively or negatively, in a vacuum. The second pressurizable chamber 122 may be adjacent to the side of the piston 114 that is attached to the piston rod 112. The second pressurizable chamber 122 may be pressurized to maintain the position of the piston 110 in the cylinder 100 bore 116, to move the piston 110 through at least a portion of the cylinder 100 bore 116, or to act on the piston 110 in any desired way. The second pressurizable chamber 122 may also be filled with pressurized fluid, such as air or water-soluble hydraulic fluid, for example, to maintain the piston 110 in or near a desired position in the cylinder 100 bore 116.

The cylinder 100 in the embodiment illustrated in FIG. 7 includes a first inlet port 124 passing from the extended bar 462 through the cylinder 450 into the first pressurizable chamber 120 and in fluid communication with the first pressurizable chamber 120. The cylinder also includes a second inlet port 126 passing through the cylinder 450 into the second pressurizable chamber 122 and in fluid communication with the second pressurizable chamber 122. A first pressurized fluid source 130, such as a first accumulator, may be connected to the first inlet port 124 and a second pressure source, such as a second accumulator, may be connected to the second inlet port 126.

It should be recognized that the second inlet port 126 may not be included in certain embodiments, including certain embodiments wherein the second chamber 122 is not pressurized, for example in a single-acting cylinder 50 embodiment wherein the piston 110 is biased toward the first pressurizable chamber 120 by a spring 118, a predetermined pre-established fluid pressure, or other biasing apparatus or method.

In the embodiment illustrated in FIG. 7, the fluid channel 460 is formed, at least in part, in the extended bar 462 by gun drilling the fluid channel 460 through the extended bar 462. The extended bar 462 is welded onto the fluid driven cylinder 450 and the fluid channel 460 is extended into the fluid driven cylinder 450 at the first inlet port 124. In the embodiment illustrated, a flow control valve 128 controls flow of fluid into or out of the first pressurizable chamber 120. The fluid channel 460 is in fluid communication with a hydraulic fluid reservoir 131 at a first end 70 and is extended through the fluid driven cylinder 50 inlet port 124, 126 at a second end 72.

In a double-acting cylinder configuration, one fluid channel 60 may be provided for both pressurizable chambers 120, 122 or a separate fluid channel 60 may be provided for each pressurizable chamber 120, 122.

The extended bar 60 beneficially does not have one or more internal spaces where dirt, stones, and other earth can gather. That extended bar 60 also beneficially does not have a hydraulic fluid conduit that can corrode from earth components gathered therearound. Moreover, no earth and accumulating materials have to be cleaned from around the extended bar 60 reducing maintenance time from prior exposed or guarded hydraulic lines that run external and proximate to the fluid driven cylinder 50.

The extended bar 60 in certain embodiments does not extend into the fluid driven cylinder 50, and because of that, does not reduce the size of the fluid driven cylinder 50 or the space the fluid driven cylinder 50 has to operate.

FIG. 7 furthermore illustrates an embodiment of a cylinder 450 of the present invention in which a hydraulic cylinder 450 has an integral fluid channel 460 disposed on or in an extended bar 462 to prevent damage from occurring to the fluid channel 460 between the hydraulic cylinder 450 and the fluid channel 460. The cylinder 450 of that embodiment includes a cylinder barrel 51, an end cap, 54 and a base 56.

In an embodiment of the cylinder 450, the cylinder is a hydraulic cylinder having a hydraulic cylinder barrel 51. The hydraulic cylinder barrel 51 has a continuous axial inner surface 52 forming an inner chamber 53 or bore 116 having a cross-section, a first end 70, and a second end 72. The end cap 54 covers the first end 70 of the hydraulic cylinder barrel 51 such that no appreciable amount of fluid can pass through the first end 70 of the hydraulic cylinder barrel 51. A base 56 covers the second end 72 of the hydraulic cylinder barrel 51 such that no appreciable amount of fluid can pass through the second end 72 of the hydraulic cylinder barrel 51. The base 56 has a rod opening 108 through which a piston rod 112 extends.

A piston 110 is disposed in and extends across the cross-section of the inner chamber 53 or bore 116 of the hydraulic cylinder barrel 51, the piston 10 having a first side 114 facing the second end 72 of the hydraulic cylinder barrel 51 and a second side 115 facing the first end 70 of the hydraulic cylinder barrel 51. The first side 114 of the piston 110 in the embodiment illustrated is flat, substantially perpendicular to the second end 72 of the hydraulic cylinder barrel 51, and substantially parallel to the end cap 54. The second side 115 of the piston 110 in the embodiment illustrated is flat and substantially perpendicular to the first end 70 of the hydraulic cylinder barrel 51 and substantially parallel to the base 56.

The hydraulic cylinder barrel 51 also has a first fluid chamber 120 defined by the second side 115 of the piston 110, a first portion of the inner surface 52 of the cylinder barrel 51, and the end cap 54 and a second chamber 22 defined by the first side 114 of the piston 110, a second portion of the inner surface 52 of the cylinder barrel 51, and the base 56.

A piston rod 112 is attached to the first side 114 of the piston 110. The piston rod 112 extends coaxially through the second chamber 122 of the hydraulic cylinder barrel 51 and through the rod opening 108 in the base 56.

An extended bar 462 has a first surface 464 continuously contacting the hydraulic cylinder barrel 51 and a hydraulic fluid passage 460 formed inside the extended bar 462 and extending into the first fluid chamber 120.

The cylinder 50 illustrated in FIG. 4 includes a hydraulic fluid flow control valve 128 attached to a first end of a hydraulic fluid channel 460 and adjacent to a penetration into the first pressurizable chamber 120 of the cylinder 50. That hydraulic fluid flow control valve 128 controls or meters hydraulic fluid that flows from the hydraulic fluid channel 460 to the first pressurizable chamber 120. That hydraulic fluid flow control valve 128 may also control or meter hydraulic fluid flowing out of the first pressurizable chamber 120.

In one embodiment, one or more first valves 128 permits fluid under pressure to enter the first pressurizable chamber 120 from the pressurized fluid source 130 and one or more fluid relief valves 129 relieve pressurized fluid from the first pressurizable chamber 120.

The cylinder 50 illustrated in FIG. 4 also includes a seal 116 attached to the base 56 adjacent to where the piston rod 112 extends through the base 56.

The cylinder 50 illustrated in FIG. 4 also includes a rod clevis 440 attached to a second end 415 of the piston rod 112 that extends out of the hydraulic cylinder barrel 51 through the base 56 and a cylinder clevis 442 attached to the end cap 54 and extending away from the cylinder barrel 51 and the first pressurizable chamber 120. One of the clevises 440, 442 may be attached to a fixed or stationary point, such as a grounding strut, a base, or the chassis of a mechanism and the other clevis 440, 442 may be attached to an arm or other apparatus to be moved by the cylinder 50.

The cylinder 50 illustrated in FIG. 4 may be a double-acting cylinder that uses hydraulic fluid applied to the first pressurizable chamber 120 to extend the piston rod 112 further out from the cylinder barrel 51 and uses hydraulic fluid applied to the second pressurizable chamber 122 to retract the piston rod 112 into the cylinder barrel 51. The first fluid channel 460 is disposed in the extended bar 462 to pressurize the first pressurizable chamber 120 and a second fluid channel 461 is disposed in the extended bar 462 to pressurize the second pressurizable chamber 122. In certain embodiments, the first fluid channel 460 may be disposed in a first extended bar 462 and the second fluid channel 461 may be disposed in a second extended bar 463.

In the embodiment illustrated in FIG. 4, a single extended bar 462 is disposed on the cylinder barrel 51. That single extended bar 462 may house or contain two fluid channels 460 and 461, the first fluid channel 460 supplying hydraulic fluid to the first pressurizable chamber 120 and the second fluid channel 462 supplying hydraulic fluid to the second chamber 122, which is a pressurizable chamber 122. That extended bar 462 is attached to the external surface 66 of the cylinder barrel 51 along an attached surface 464 of the extended bar 462. Alternatively, the extended bar 462 may be formed on the cylinder barrel 51.

In other embodiments, the extended bar 62 or 462 may be integral to the cylinder barrel 51 and may not extend from the external surface 66, 466 of the cylinder barrel 51. In embodiments wherein the extended bar 62, 462 is formed integral to the cylinder barrel 51 it may or may not extend into the inner chamber 53 of the cylinder barrel 51 and may or may not impede on the inner surface 52 of the cylinder barrel 51.

It should be noted that the piston may be a shape other than round and may travel through a complimentary uniformly shaped inner chamber 53. Thus, the extended bar 62, 462 may extend into the inner chamber 53 of the cylinder barrel 51 in certain embodiments. For example, the inner chamber 53 of the cylinder barrel 51 may be substantially round in cross-section with a rectangular or round indentation extending the length of the inner chamber 53. In such an embodiment, the piston 110 may be shaped with a shape similar to the cross-section of the inner chamber 53 including the cross-section of the indentation in the inner chamber 53.

FIG. 8 illustrates a perspective view of a pipe 560 carrying fluid disposed along a hydraulic cylinder 550. The pipe 560 is attached to a valve 527 at a first end 562 and in fluid communication with the cylinder 550 at a second end 564. A guard 570 is disposed over the pipe 560 and attached to the cylinder 550. In use, debris collects under the guard 570, which corrodes and otherwise damages the pipe 570.

Figure 9:
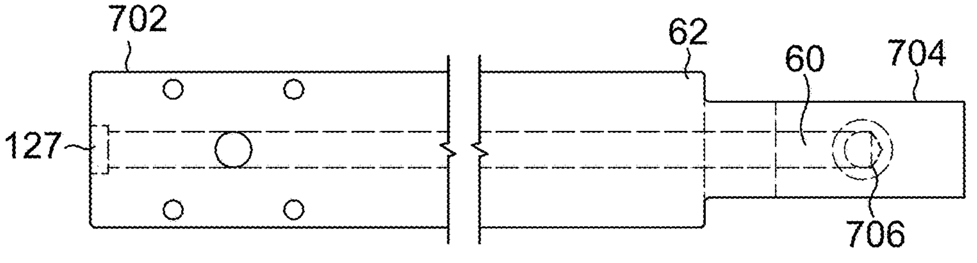
FIG. 9 illustrates a top view of an extended bar.

FIG. 9 illustrates a top view of an extended bar 62. The extended bar 62 is adjacent a flow control device 127 at a first end 702 of the extended bar 62 and contains a fluid channel 60 that is in fluid communication with the flow control device 127. The extended bar 62 encompasses the fluid channel 60 from the flow control device 127 to a second end 704 of the extended bar 62 and the fluid channel 60 extends out of the extended bar 62 at an opening 706 near the second end 704 of the extended bar 62.

Figure 10:
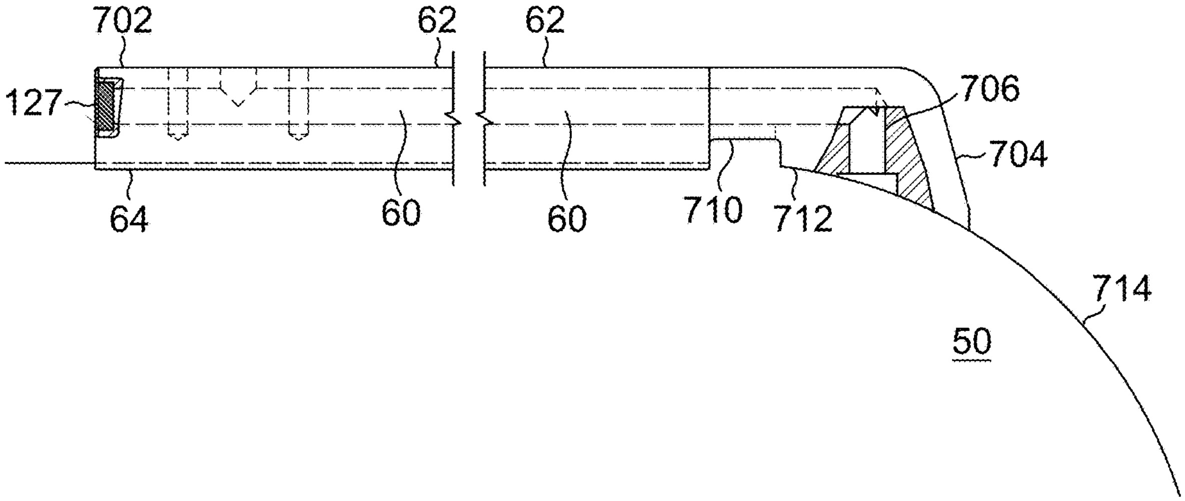
FIG. 10 illustrates a side view of the extended bar of FIG. 9 attached to a cylinder.

FIG. 10 illustrates a side view of the extended bar 62 of FIG. 6. The extended bar 62 may be attached in continuous contact with the cylinder 50 along an attached surface 64 of extended bar 62. As may be seen in FIG. 7, the extended bar 62 may be contoured to the shape of the cylinder 50, 450, fitting to ridges 710, depressions 712, and curves 714 formed on the external surface 66 of the cylinder 50, 450, including rounded cylinder 50, 450 ends 714.

The fluid channel may extend from the extended bar 62 into fluid communication with the cylinder 50 such that fluid permitted to pass the flow control device 127 can flow into the cylinder 50 or out of the cylinder 50.

Figure 11:
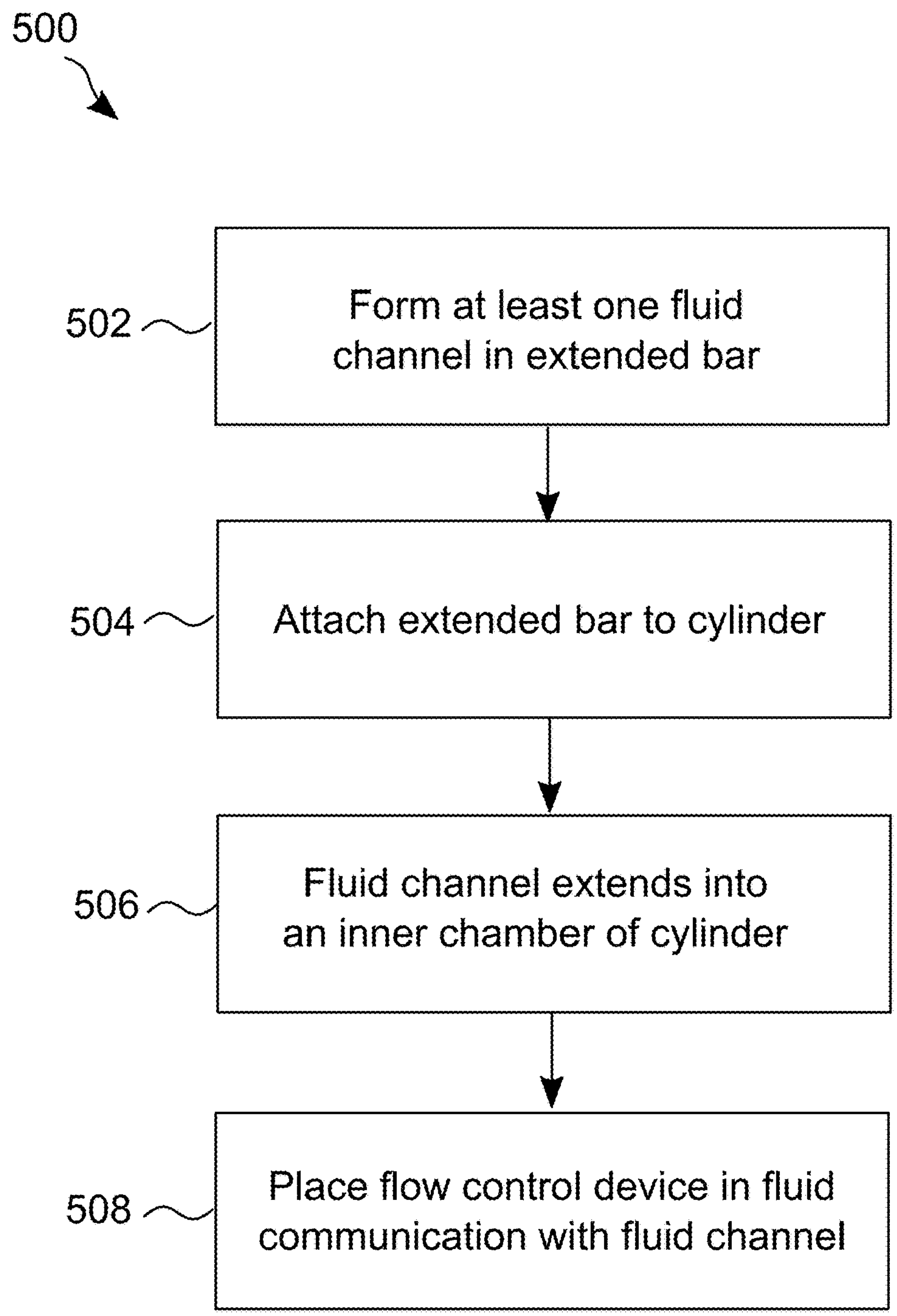
FIG. 11 illustrates a method of forming an extended bar on a hydraulic cylinder.

FIG. 11 is a flow chart of a method 500 of creating an extended bar 62 containing one or more fluid channels 60, 61 on a fluid driven, hydraulic or pneumatic, cylinder 50. The method 500 may be used with one or more embodiments and various components illustrated in and discussed in connection with FIGS. 1-7. Elements of those apparatuses e.g., 1, 50, and 62 discussed in connection with those Figures will be referred to in this method 500.

The method 500 may include, at 502, forming at least one fluid channel 60, 61 in an extended bar 62. At 504, the extended bar 62 is attached to a hydraulic or pneumatic cylinder 50. At 506, the at least one fluid channel 60, 61 is extended into a pressurizable chamber 120, 122 of the cylinder 50. At 508, a flow control device 127, 128 is placed in fluid communication with the fluid channel 60, 61 for controlling fluid flow to the inner chamber 120, 122 of the cylinder 50.

While specific embodiments of the invention have been described in detail, it should be appreciated by those skilled in the art that various modifications and alternations and applications could be developed in light of the overall teachings of the disclosure. Accordingly, the particular arrangements, apparatuses, and methods disclosed are meant to be illustrative only and not limiting as to the scope of the invention.

What is claimed is:

1. A longwall mine shield, comprising:

two parallel pontoons that support a pair of hydraulically operated leg cylinders that, in turn, support a canopy and a caving back connected to the two pontoons and the canopy by way of front and rear links, the canopy being connected to each of the pair of hydraulically operated leg cylinders by a pin to adjust the canopy;

each of the hydraulically operated leg cylinders include:

a hydraulic cylinder barrel that has an axial inner surface having a cross-section, an outer surface, a first end enclosed by an end cap, and a second end;

a first piston disposed in and extending across the cross-section of the inner chamber of the hydraulic cylinder barrel, the first piston having a first end proximate the first end of the hydraulic cylinder barrel, a second end distal from the first end of the hydraulic cylinder barrel, and an axial inner surface closed at the first end of the first piston;

a first fluid chamber defined by the first end of the piston, a first portion of the axial inner surface of the hydraulic cylinder barrel, and the end cap of the hydraulic cylinder barrel;

a second piston disposed in and extending across the cross-section of the axial inner surface of the first piston, the second piston having a first end proximate the first end of the first piston, and a second end distal from the first end of the first piston;

a second fluid chamber defined by the first end of the second piston and the closed axial inner surface of the first piston;

an extended bar that protects a hydraulic fluid passage that passes therethrough to the hydraulic cylinder barrel, the extended bar having a first surface continuously attached to the hydraulic cylinder barrel, is contoured to ridges of the hydraulic cylinder barrel, and extends along a rounded hydraulic cylinder barrel end; and the hydraulic fluid passage formed inside the extended bar and extending into the first fluid chamber.

2. The longwall mine shield of claim 1, further comprising a check valve positioned through the first piston that permits fluid flow from the first fluid chamber to the second fluid chamber and does not permit fluid flow from the second fluid chamber to the first fluid chamber, the check valve having a switch that opens the check valve to permit fluid flow from the second fluid chamber to the first fluid chamber when the switch contacts the hydraulic cylinder barrel.

* * * * *